UNITED STATES PATENT OFFICE.

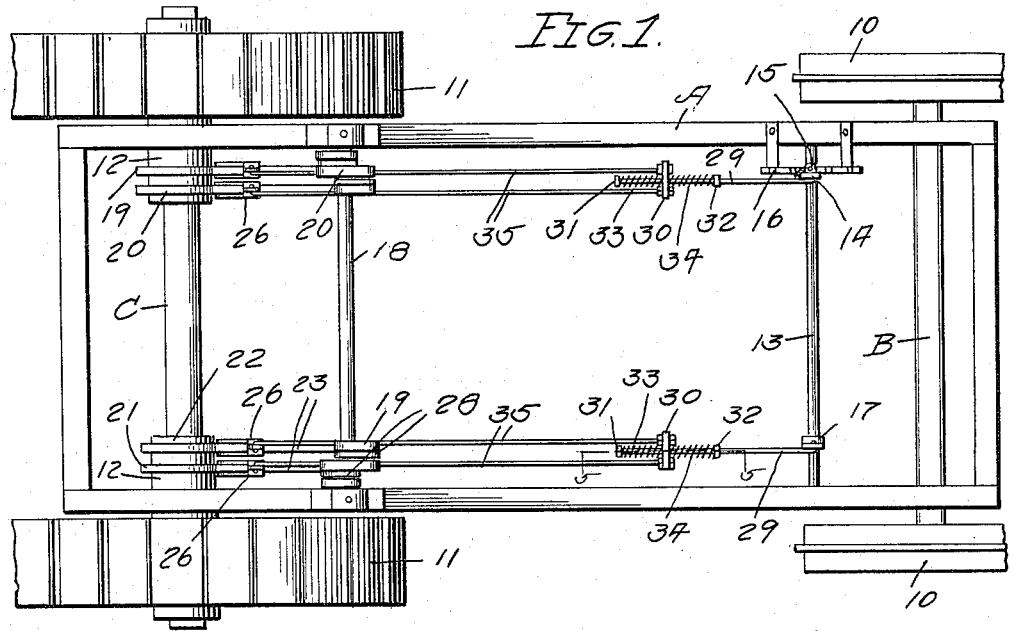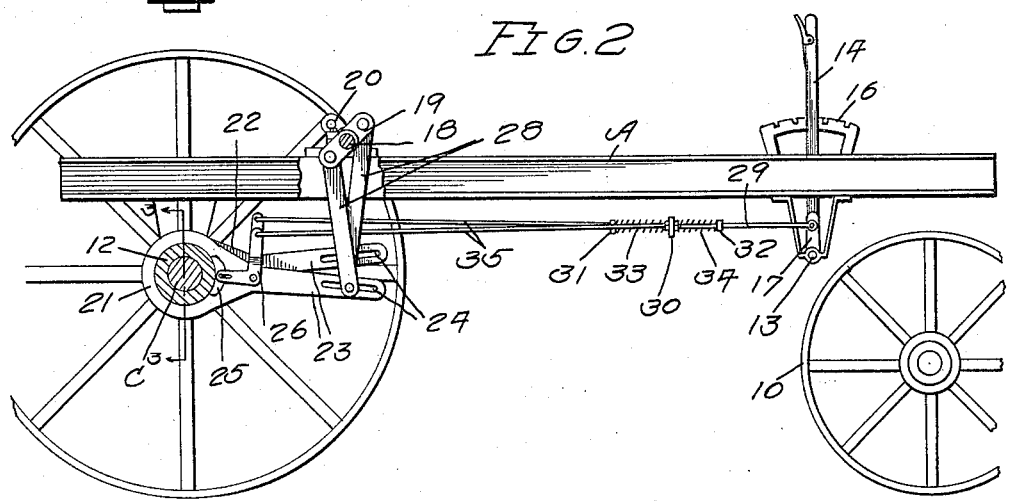

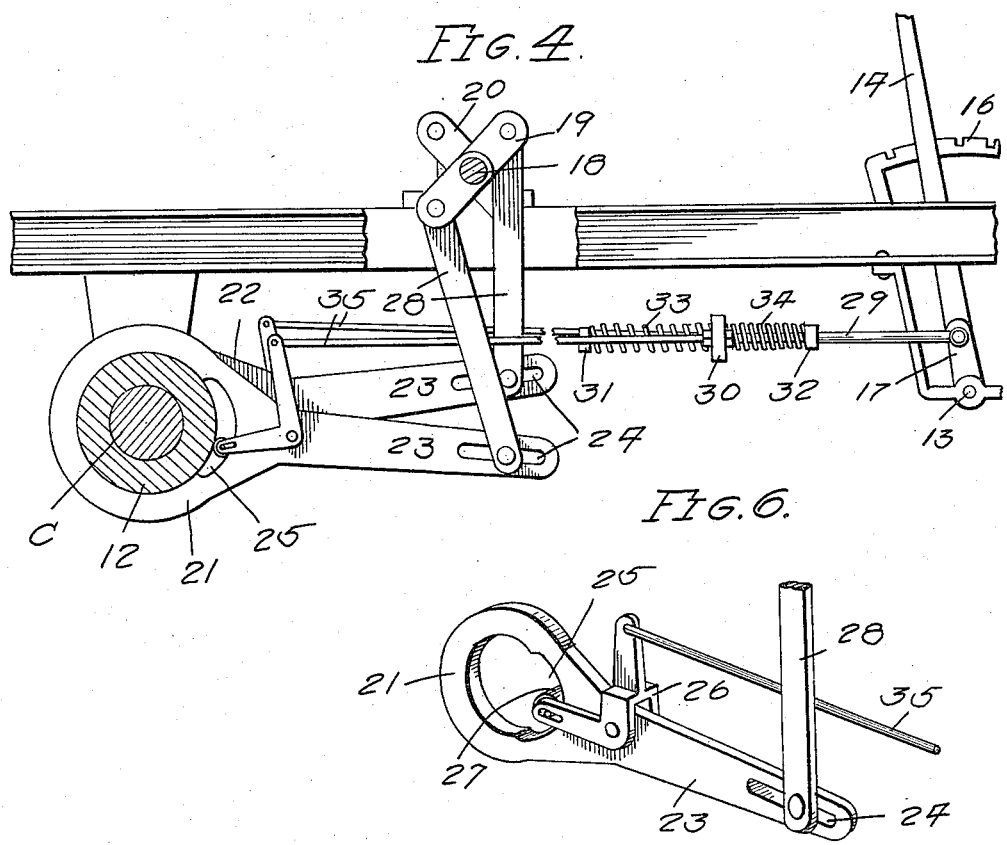

JOHN W. RANSOMER, OF BATESVILLE, ARKANSAS.

INTERMITTENT OPERATING MECHANISM.

1,172,310. Specification of Letters Patent. Patented Feb. 22, 1916.

Application filed December 15, 1913. Serial No. 806,862.

*To all whom it may concern:*

Be it known that I, JOHN W. RANSOMER, a citizen of the United States, residing at Batesville, in the county of Independence, State of Arkansas, have invented certain new and useful Improvements in Intermittent Operating Mechanism; and I do hereby declare the following to be a full, clear, and exact description of the invention, such as will enable others skilled in the art to which it appertains to make and use the same.

This invention relates to transmission gearing for motor vehicles and tractors.

The object of the invention resides in the provision of a transmission gearing which will eliminate the use of spur gears more or less complicated compensating mechanism.

A further object of the invention resides in the provision of a transmission gearing of the character referred to which will be simple in construction, efficient in use, and which may be manufactured and installed at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the improved transmission gearing applied to a tractor; Fig. 2, a side elevation of Fig. 1 with the near rear wheel cut away for the purpose of disclosing the part connected to the extension on the inner end of its hub; Fig. 3, a section on the line 3—3 of Fig. 2; Fig. 4, a view of a fragment of what is shown in Fig. 2 with the parts set to effect a backward movement of the tractor; Fig. 5, an enlarged section on the line 5—5 of Fig. 1; Fig. 6, a perspective view of one of the oscillating arms of the structure and certain contiguous parts coöperating therewith.

Referring to the drawings A indicates the frame of a tractor, B the front axle, and C the rear axle. Mounted upon the front axle B are the usual traction wheels 10, while traction wheels 11 are mounted upon the rear axle C for rotation thereon. Each of the traction wheels 11 has secured to its inner side a hub extension 12 for a purpose that will presently appear. Rotatably mounted upon the frame A between the axles B and C is a transverse shaft 13 which has fixed thereto adjacent one side of the frame A an operating lever 14 through the instrumentality of which the shaft 13 may be rotated. This lever 14 carries a spring pawl 15 coöperating with a toothed segment 16 mounted upon the frame A for the purpose of securing the lever 14 in a desired adjustment. Also fixed upon the shaft 13 in the same plane with the lever 14 and adjacent the opposite side of the frame A is an arm 17. Rotatably mounted on the frame A between the rear axle C and the shaft 13 is a transverse shaft 18 which is adapted to be rotated through the medium of suitable connections with the motor of the tractor (not shown). The shaft 18 is provided adjacent one end with crank portions 19 disposed oppositely and in the same plane. This shaft 19 is also provided adjacent its other end with crank portions 20 disposed oppositely to each other and in a plane at right angles to the crank portions 19.

Rotatably mounted on each hub extension 12 are rings or yokes 21 and 22 each of which has formed integral therewith a forwardly extending arm 23 provided adjacent its free end with a longitudinal slot 24. The inner edge of each ring 21 and 22 is recessed as at 25, said recess being disposed in line with the arm 23 and having its rear wall converging from its center in each direction toward the periphery of the hub extension 12. Pivotally mounted on each arm 23 is a forked angle lever 26 which carries between its arms for limited bodily movement relative to the arm a roller 27 extending through the recess 25 of the collar 21 or 22 with which said angle lever is associated. It will be noted that the axis of rotation of the roller 27 is parallel to the axis rotation of the axle C and that by oscillating the angle levers 26 the rollers 27 can be moved from one end of the recess 25 to the other. Secured to crank portions 19 and 20 are corresponding ends of links 28, the other ends of said links being slidably engaged in respective slots 24 of the arms 23 whereby rotation of the crank shaft 18 will effect an oscillation of the arms 23 and the rings 21 and 22.

A rod 29 has one end connected with the lever 14 and is slidably engaged through a bar 30. The end of the rod 29 remote from the lever 14 has engaged thereon a head 31, while another head 32 is mounted on said rod between the lever 14 and the bar 30. Encircling the rod 29 and having one end bearing against the head 31 and its other end against the bar 30 is a spring 33. Also encircling the rod 29 and having one end bearing against the head 32 and its other end against the bar 30 is a spring 34. The terminals of the bar 30 are connected respectively to adjacent angle levers 26 by means of rods 35. A similar structure connects the arm 17 with the angle levers 26 which are associated with the rings 21 and 22 mounted on the extended hub 12 of the wheel 11 which is located on the opposite side of the tractor and the same reference characters are employed to designate such similar parts.

In the operation of the transmission it will be obvious that when the lever 14 is disposed in the position shown in Fig. 2 the rollers 27 will all be disposed at the upper ends of respective recesses 25 and in binding relation to both the periphery of the adjacent hub extension 12 and the rear wall of the adjacent recess 25 so that when the arms 23 are moved downwardly the axle C will be locked to the corresponding ring 21 and 22 with the result that the rotation of the shaft 18 will effect a rotation of the axle C in a direction to move the tractor forward. When the lever 14 is disposed in the position shown in Fig. 4 the rollers 27 will be positioned at the lower ends of respective recesses 25 so that the collars 21 and 22 will be locked to the axle C only when the arms 23 move upwardly. With this status present it will be obvious that the rotation of the shaft 18 will effect a rotation of the axle C in a direction to cause backward movement of the tractor. When the lever 14 is disposed vertically or at right angles to the frame A it will be apparent that the oscillation of the rings 21 and 22 will be without effect on the axle C.

What is claimed is:—

The combination with a motor vehicle frame and a drive axle rotatably mounted on the frame, a ring rotatably mounted on the axle, an arm on said ring, the ring being provided with a recess in its inner walls adjacent the axle, said recess tapering from its center toward each end, a drive shaft mounted on the frame, and including a crank portion, connections between the crank portion and the arm whereby the rotation of the shaft will oscillate the ring, a bell-crank pivoted on the arm, a roller carried by the bell-crank and engaged in the recess of the ring, and adapted to connect the ring and axle during movement of the ring in one direction, a lever pivoted on the frame, and a yielding connection between the lever and bell-crank.

In testimony whereof, I affix my signature, in the presence of two witnesses.

JOHN W. RANSOMER.

Witnesses:
C. W. MAXFIELD,
W. Y. BARR.

Copies of this patent may be obtained for five cents each, by addressing the "Commissioner of Patents, Washington, D. C."